June 5, 1928.

F. DECOTEAU 1,672,753

MECHANICAL HOE

Filed June 1, 1927

Frank Decoteau
INVENTOR

BY Victor J. Evans
ATTORNEY

WITNESS:

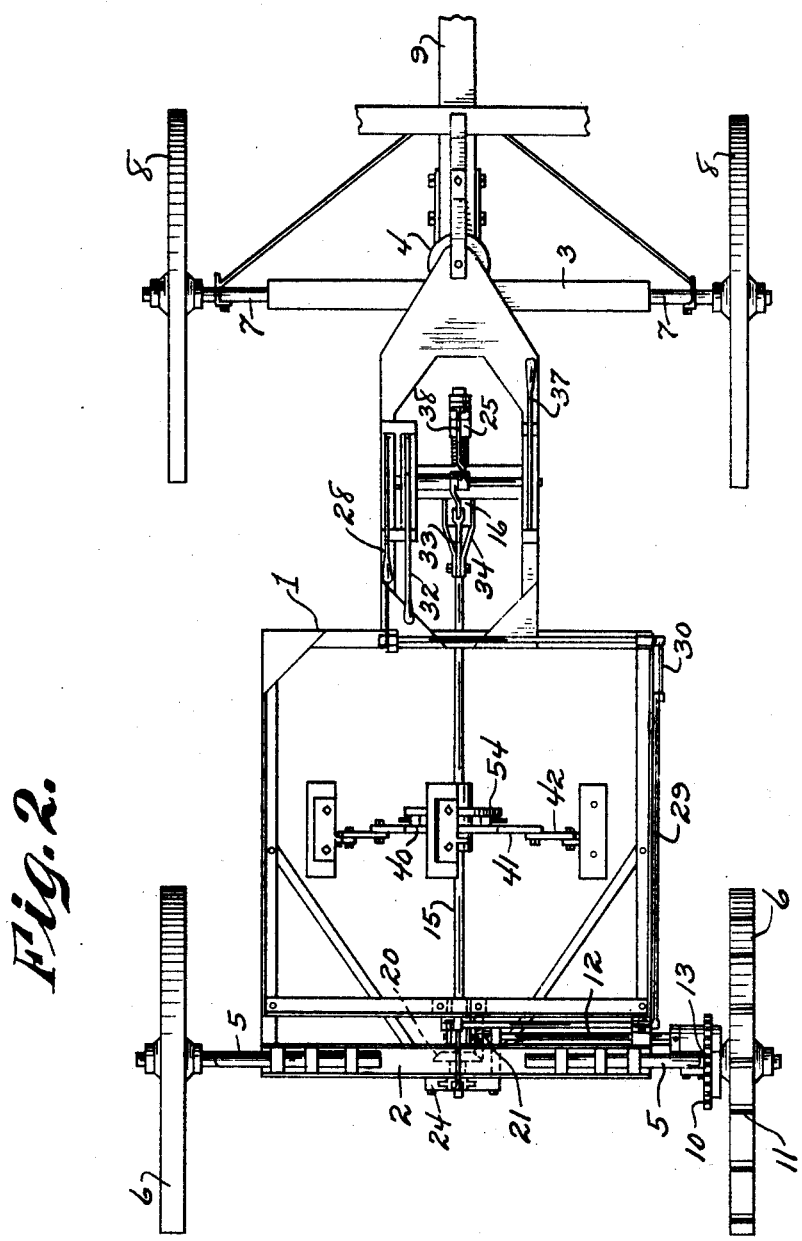

June 5, 1928.　　　　　　　　　　　　　　　　　1,672,753
F. DECOTEAU
MECHANICAL HOE
Filed June 1, 1927　　　　　4 Sheets-Sheet 3
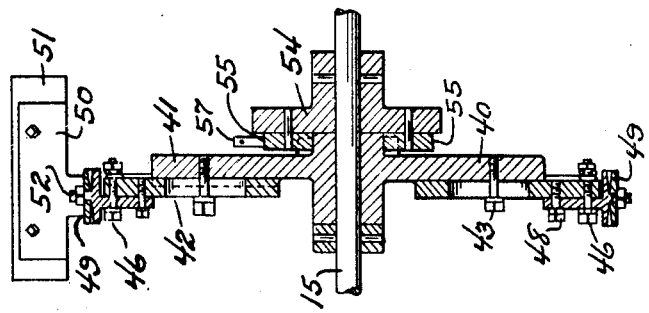
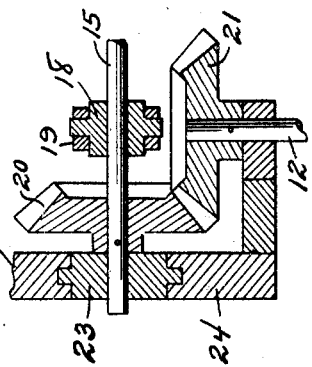
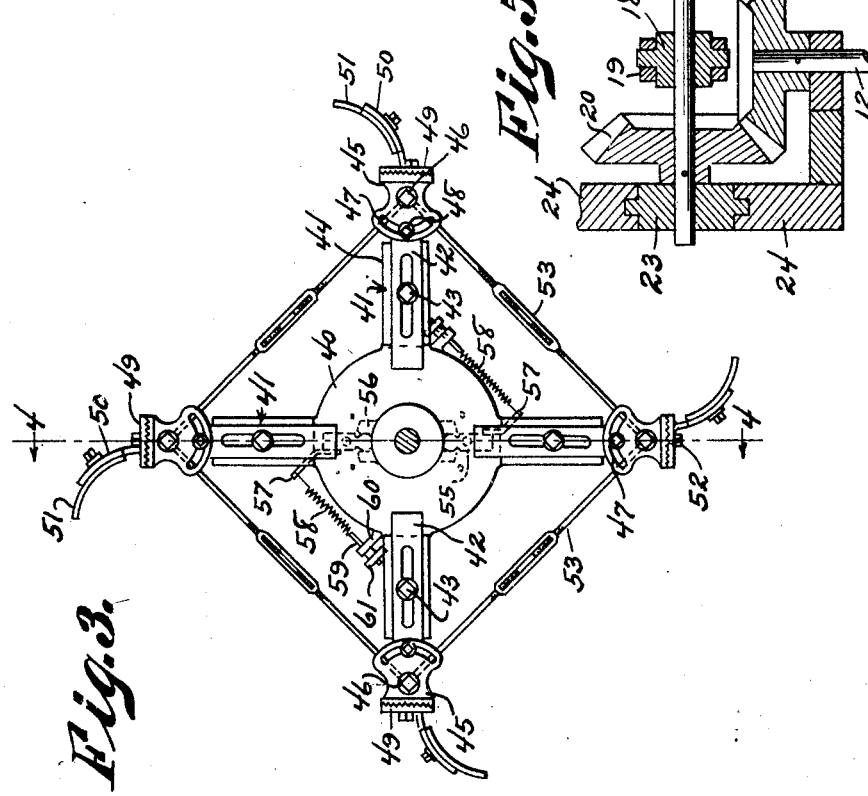

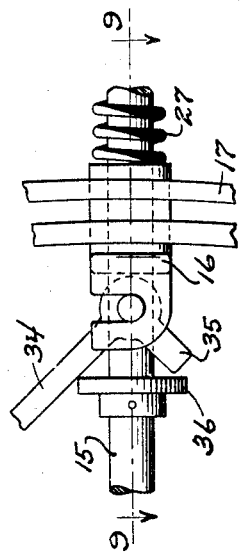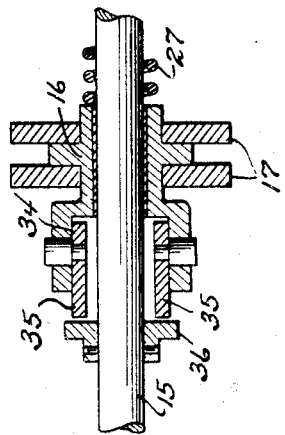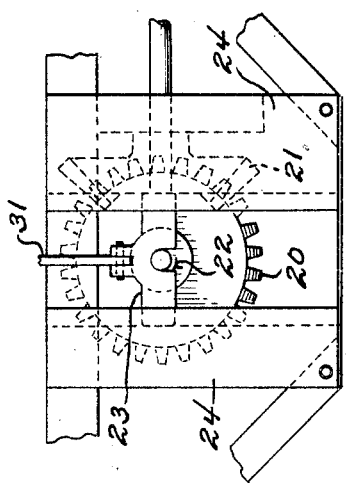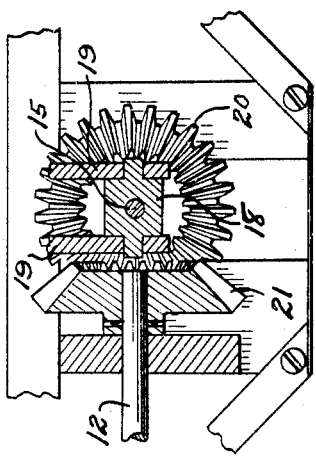

Patented June 5, 1928.

1,672,753

UNITED STATES PATENT OFFICE.

FRANK DECOTEAU, OF DUTCH TOWN, LOUISIANA.

MECHANICAL HOE.

Application filed June 1, 1927. Serial No. 195,738.

This invention relates to an agricultural implement, the general object of the invention being to provide a wheel supported frame having a plurality of hoes thereon, with means for actuating the hoes as the machine is pulled along so that the hoes will be brought in contact with the ground to dig up the ground.

Another object of the invention is to provide means for adjusting the hoes in relation to the ground and for releasing them from the actuating means when they strike an obstruction to prevent damage to the parts.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 2 is a plan view thereof.

Figure 3 is a section on line 3—3 of Figure 1.

Figure 4 is a section on line 4—4 of Figure 3.

Figure 5 is a section on line 5—5 of Figure 1.

Figure 6 is a rear view of the central part of the device.

Figure 7 is a section on line 7—7 of Figure 1.

Figure 8 is a side view of the supporting means for the front end of the driven shaft.

Figure 9 is a section on line 9—9 of Figure 8.

Figure 1:
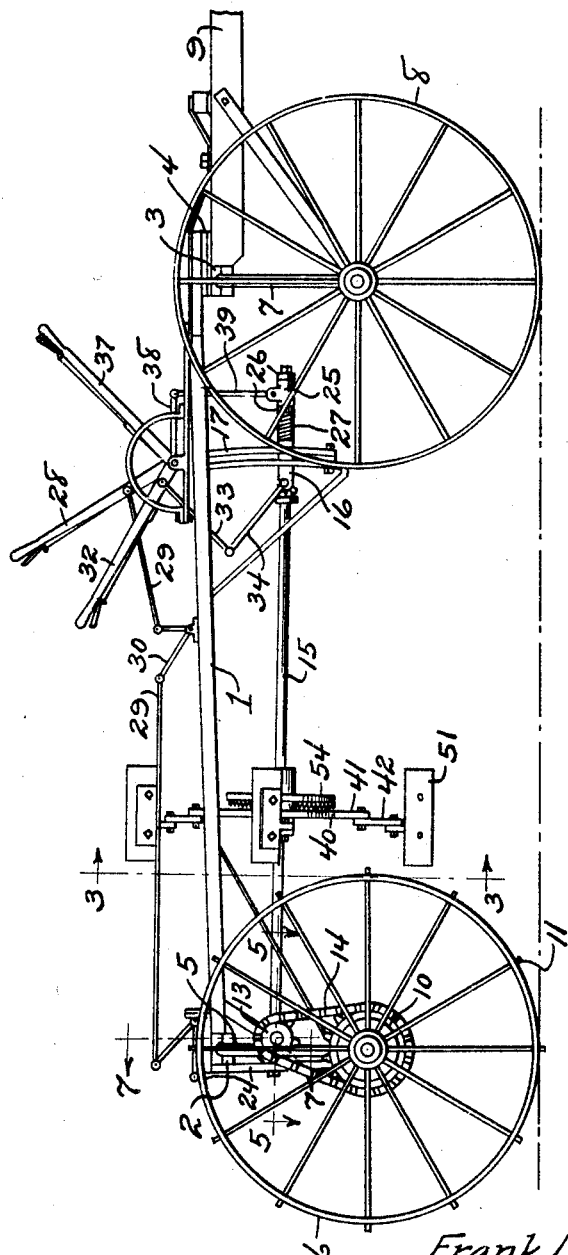
Figure 1 is an elevation of the device.

In these views, 1 indicates the main frame of the device which includes the rear beam 2 and which is supported at its front by the front beam 3 which is connected with the front end of the frame by the fifth wheel arrangement 4.

The rear beam 2 has adjustably connected therewith the crank shafts 5 which carry the rear wheels 6, while the front beam 3 has adjustably connected therewith the crank shafts 7 which carry the front wheels 8. By adjustably connecting the shafts with the beams, the wheels can be moved toward or away from the frame. A tongue 9 is attached to the beam 3 and one of the rear wheels 6 has fastened thereto a sprocket 10, and this wheel may be provided with the lugs 11 for preventing it from slipping.

A shaft 12 is transversely arranged at the rear of the frame, and the outer end of this shaft carries a sprocket 13, a chain 14 passing over this sprocket and the sprocket 10 so that the shaft 12 will be driven from the rear wheel 6. A longitudinally driven shaft 15 has its front part rotatably mounted in a bearing member 16 which is movably supported in the guides 17 which depend from the front part of the frame, and the rear part of the shaft passes through a boxing 18 which is pivotally arranged in the supports 19 which depend from the rear part of the frame. The shaft 15 has a beveled gear 20 connected thereto and this gear meshes with a gear 21 fastened to the inner end of the shaft 12. The gear 20 is arranged in rear of the boxing 18 and the rear end of the shaft 15 passes through a notch 22 formed in a thrust block 23 which is supported for sliding movement in the guides 24 vertically arranged at the rear of the frame, the rear part of the gear 20 bearing against the front face of the thrust block. A sleeve 25 is rotatably connected with the front end of the shaft 15 by means of the collars 26, and a coil spring 27 is mounted on the shaft between the inner collar and the front end of the member 16. This spring tends to move the shaft 15 forwardly and thus hold the gear 20 in mesh with the gear 21, it being understood that the shaft is slidably mounted in the member 16 and the boxing 18.

A hand lever 28 is mounted on the frame adjacent the driver's seat, this seat not being shown, and said lever is connected by a series of links 29 and bell cranks 30 with a rod 31 which is pivotally connected with the thrust block 23 so that when the lever is thrust forwardly, the block will be raised out of engagement with the gear 20 so that the shaft and gear can be moved rearwardly to throw the gears 20 and 21 out of mesh. This rearward movement of the shaft 15 is imparted to its through means of a hand lever 32 pivotally arranged on the frame adjacent the driver's seat and being connected by a link 33 with a lever 34 which has its lower forked end pivoted in the member 16, the prongs of the fork being provided with extensions 35 for engaging a collar 36 fastened to the shaft 15 so that when the hand lever is moved forwardly, the extensions will press against the collar by the tilting movement of the lever 34 and thus the shaft 15 is moved rearwardly. The spring 27 moves the shaft forwardly again to place the gears in mesh when the hand lever is lowered.

A third hand lever 37 is pivoted to the frame and has an arm 38 on its lower end which is connected by a link 39 with the sleeve 25, so that when the hand lever 37 is moved rearwardly, the link 39 will lift the sleeve and the front end of the shaft 15, and in this movement the member 16 will slide in the guides 17, while the boxing 18 pivots in its supports 19.

A disk 40 is rotatably mounted on the shaft, said disk being formed with the radiating arms 41 and a slotted member 42 is adjustably connected with each arm by means of a bolt 43 which passes through the slot into the arm, the arm being provided with the flanges 44 at its sides for forming guideways for the member 42. A head 45 is pivotally connected to the outer end of each member 42 by means of a bolt 46 and the inner end of the shank of each head is provided with an arc-shaped slot 47 through which passes a bolt 48 which enters the member 42 so that the head can be adjusted on the bolt 46 through means of the slot and bolt 48. The face of the head is toothed to engage a toothed base 49 of a curved tool carrying member 50 to which is bolted a curved blade 51, the base and head being pivotally connected together, as shown at 52. The outer ends of the members 42 are connected together by the turnbuckle braces 53.

Thus it will be seen that each blade carrying member can be adjusted about the pivot 52 and each member 45 can be adjusted about its pivot 46, while each member 42 can be adjusted on the disk to place the blade the desired distance from the center of the disk.

A clutch disk 54 is fastened to the shaft 15 and has pivoted thereto a pair of levers 55, each lever having a rounded head adapted to engage the space formed by a pair of lugs 56 on the hub of the disk 40. These levers are held against movement by the latch members 57 pivoted to the clutch disk 54 and yieldingly held against the levers by the springs 58, each of which has one end connected with the latch and its other end connected to a rod 59 which passes through a stud 60 on the disk 54 and having its threaded end engaged by a nut 61 so that the tension of the spring can be adjusted.

Thus the clutch disk, having its levers engage the lugs 56 on the blade carrying disk 40, will cause the said disk 40 to rotate with the shaft 15, but if a blade should strike an obstruction, the blade carrying disk will come to rest while the clutch disk 54 continues to move so that the lever 55 will rock on its pivot, tilting the latch 57 against the action of the spring 58 until the head of the lever passes from between the lugs 56 and thus the shaft and clutch disk can rotate without the blades and their disks 40 rotating. This will prevent damage to the parts if the hoes or blades strike an object or obstruction.

From the foregoing it will be seen that I have provided means for digging up the soil by the hoes or blades as the device travels over the ground, and when it is desired to stop the hoes from revolving, the hand lever 28 is actuated to lift the thrust block 23 and then the hand lever 32 is actuated to move the shaft 15 rearwardly, so that the gear 20 will be moved out of mesh with the gear 21 and thus the shaft 15 will come to rest. The shaft 15 can be adjusted to raise the hoes above the ground by actuating the lever 37, and the hoes or blades can be adjusted to place them in the most desirable position for the work to be done, through the means above described.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. An agricultural implement comprising a wheeled frame, a longitudinally arranged shaft therein, a boxing pivoted to the rear part of the frame and through which the shaft passes, a depending guideway at the front of the frame, a member sliding therein and through which the shaft passes, a sleeve rotatably connected with the front end of the shaft, a spring arranged on the shaft between the sleeve and the sliding member, a thrust block supported for vertical movement at the rear of the frame and through which the shaft passes, a gear on the shaft bearing against the thrust block, a hand lever connected with the thrust block for raising the same, a hand lever connected with the sleeve for raising the front end of the shaft, a third hand lever, a lever connected therewith and pivoted in the guideways at the front of the frame and having a part for engaging a part of the shaft to move the shaft rearwardly against the action of the spring, a shaft driven from one of the ground wheels, a gear thereon meshing with the gear on the first mentioned shaft and a blade carrying member carried by the first shaft.

2. An agricultural implement comprising a wheeled frame, a longitudinally arranged shaft therein, a boxing pivoted to the rear part of the frame and through which the shaft passes, a depending guideway at the front of the frame, a member sliding therein and through which the shaft passes, a sleeve rotatably connected with the front end of the shaft, a spring arranged on the shaft between the sleeve and the sliding member, a thrust block supported for vertical movement at the rear of the frame and through which the shaft passes, a gear on the shaft bearing against the thrust block, a hand lever connected with the thrust block for raising the same, a hand lever connected with the sleeve for raising the front end of the shaft, a third hand lever, a lever connected therewith and pivoted in the guideways at the front of the frame and having a part for engaging a part of the shaft to move the shaft rearwardly against the action of the spring, a shaft driven from one of the ground wheels, a gear thereon meshing with the gear on the first mentioned shaft, a blade carrying member carried by the first shaft and clutch means for connecting the blade carrying member with the shaft, with means for freeing the blade carrying member from the clutch means if a blade strikes an obstruction.

In testimony whereof I affix my signature.

FRANK DECOTEAU.